United States Patent
Hadzimusic et al.

(10) Patent No.: US 7,336,005 B2
(45) Date of Patent: *Feb. 26, 2008

(54) SYSTEM AND METHOD FOR BROWNOUT PROTECTION OF A FET BASED BATTERY SWITCH

(75) Inventors: Samir Hadzimusic, Vancouver (CA); Simon Au, Richmond (CA)

(73) Assignee: Sierra Wireless, Inc., Richmond, B.C. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/588,069

(22) Filed: Oct. 24, 2006

(65) Prior Publication Data

US 2007/0040451 A1    Feb. 22, 2007

Related U.S. Application Data

(63) Continuation of application No. 10/279,603, filed on Oct. 23, 2002, now Pat. No. 7,145,267.

(51) Int. Cl.
    *H02J 7/00* (2006.01)
(52) U.S. Cl. .................................... 307/66
(58) Field of Classification Search .............. 307/65, 307/66
    See application file for complete search history.

(56) References Cited

U.S. PATENT DOCUMENTS

| 5,191,229 | A  | * | 3/1993  | Davis et al. ............. 307/66 |
| 5,283,707 | A  |   | 2/1994  | Conners et al. |
| 5,783,927 | A  | * | 7/1998  | Chen .................... 320/110 |
| 5,994,794 | A  |   | 11/1999 | Wehrlen |
| 6,259,171 | B1 | * | 7/2001  | Cheng ..................... 307/85 |
| 6,664,792 | B1 |   | 12/2003 | Nguyen |

* cited by examiner

*Primary Examiner*—Robert L. Deberadinis
(74) *Attorney, Agent, or Firm*—Thelen Reid Brown Raysman & Steiner LLP

(57) ABSTRACT

A switching circuit operative to switch between a first and second power source to an output is disclosed. The circuit comprises a MOSFET switch electrically connected to the first and second power sources and operative to provide power from either one of the power sources to the output. The circuit includes a RC network electrically connected to a gate of the MOSFET switch. The RC network is operative to delay switching between the first and second power sources such that the second power source has the opportunity to fully ramp-up in order to provide continuous power to the output. Accordingly, the second power source can fully provide power to the output when the power is switched from the first power source to the second power source.

20 Claims, 2 Drawing Sheets

SYSTEM AND METHOD FOR BROWNOUT PROTECTION OF A FET BASED BATTERY SWITCH

CROSS-REFERENCE TO RELATED APPLICATION

This application is a continuation of U.S. patent application Ser. No. 10/279,603, entitled "System and Method for Brownout Protection of a FET Based Battery Switch," filed on Oct. 23, 2002 now U.S. Pat. No. 7,145,267.

BACKGROUND OF THE INVENTION

1. Field of the Invention

The present invention generally relates to switching between two power sources and more particularly to a system and method of switching power between an internal battery and an external DC adapter without loss or interruption of power.

2. Status of the Prior Art

Electronic devices such as laptop computers, cell phones, PDA's, etc . . . , can be powered using either an internal battery power source or an external power source. For example, a cell phone may use a Li-Ion rechargeable battery as the internal power source and a DC adapter as the external power source. When the external power source is plugged into the device, it disables power from the internal power source so that the external power source is the sole provider of power. Similarly, when the external power source is removed from the device, power is switched to the internal power source.

The switching between the internal power source and the external power source can be accomplished through the use of a FET switch. Referring to FIG. 1, a prior art switching circuit 10 using a MOSFET switch U4 is shown. The MOSFET switch U4 has switching transistors 12 and 14, as well as diodes 16 and 18. The prior art switching circuit further includes resistor R102 and diode D10, as shown in FIG. 1.

When the DC adapter is plugged into the device, the voltage $V_{ADAPTER}$ increases gradually and the MOSFET switch U4 is turned off thereby switching off the power from $V_{BAT}$. However, there is a delay in supplying the power from the DC adapter such that the voltage at $V_{OUT}$ will drop to zero. A switching voltage regulator that draws current all the time may be connected to $V_{OUT}$. The delay in supplying power from the DC adapter creates the situation whereby there may be no current going to the switching regulator thereby resulting in 0 volts at $V_{OUT}$ for a short period of time. This voltage drop on the switching regulator is transferred to the output of the regulator such that brownout conditions may be created on sensitive digital integrated circuits.

Similarly, when the DC adapter is unplugged from the device, the MOSFET switch U4 will switch power back to the battery. Yet, when the device is unplugged, the voltage on the gates of the switching transistors 12 and 14 will decrease slowly. During this period of discharge, the MOSFET switch U4 is not fully on and incapable of supplying enough current from the battery. As such, there is again a drop in voltage at $V_{OUT}$.

The present invention addresses the above-described deficiencies in switching between power supplies by providing a circuit which instantaneously switches between power sources. The switching circuit of the present invention avoids extensive voltage drop at the output of the switching circuit during DC adapter turn-on and turn-off such that brownouts are avoided.

SUMMARY OF THE INVENTION

In accordance with a preferred embodiment of the present invention, there is provided a switching circuit operative to switch between a first and second power source. The first power source may be an internal battery to a device whereas the second power source may be an external DC adapter. The circuit comprises a MOSFET switch electrically connected to the first and second power sources and operative to provide power from either one of the power sources to the output. The circuit further includes a RC network electrically connected to the gate of the MOSFET switch. The RC network is operative to delay switching between the first and second power sources such that the second power source has the opportunity to ramp-up in order to provide continuous power to the output. Accordingly, the second power source can fully provide power to the output when the power is switched from the first power source to the second power source.

The RC network has a time constant that is greater than the switching constant of the MOSFET switch. This allows power from the second power source to fully ramp-up before being fully switched by the MOSFET switch. Typically, the time constant of the RC network is five time greater than the switching constant of the MOSFET switch.

The circuit further includes a diode electrically connected between the first power source and the output. The diode can provide power from the first power source to the output when the power is switched from the second power source to the first power source. Accordingly, power can be continuously supplied to the output when the power is switched from the second power source to the first power source.

In accordance with a preferred embodiment of the present invention, there is provided a method of switching power between a first power source and a second power source. The method comprises providing power to the output from the first power source with the MOSFET switch. Next, the switching time of the MOSFET switch is controlled by the RC network. Finally, the power is switched between the first power source and the second power source with the switch such that the second power source has time to fully ramp-up before providing power to the output. The method further includes providing power from the first power source to the output through the diode when the power is switched from the second power source to the first power source such that there is a continuous flow of power during the switch transition.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
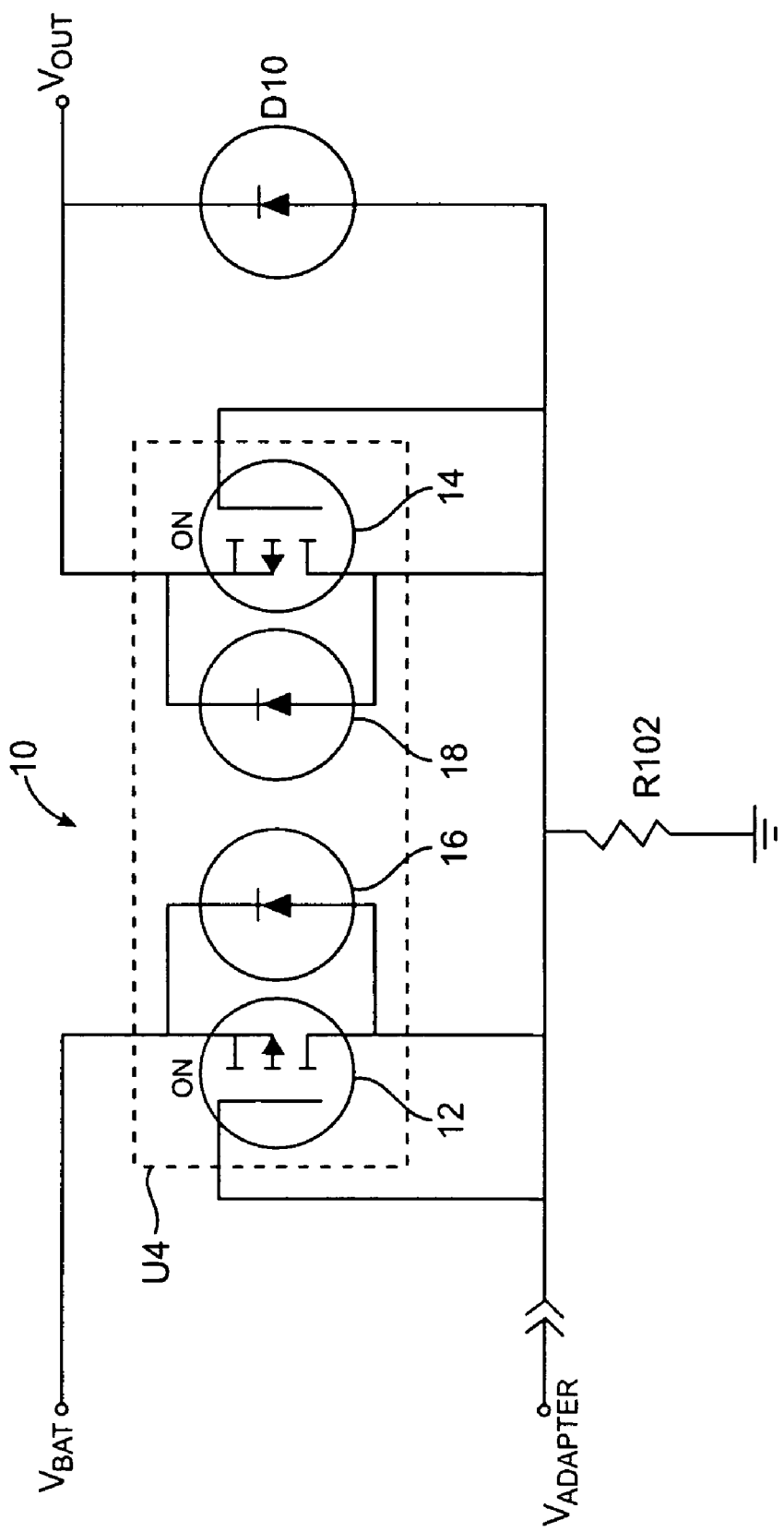
FIG. 1 is a circuit diagram of a prior art switching circuit capable of providing power between two sources.
Figure 2:
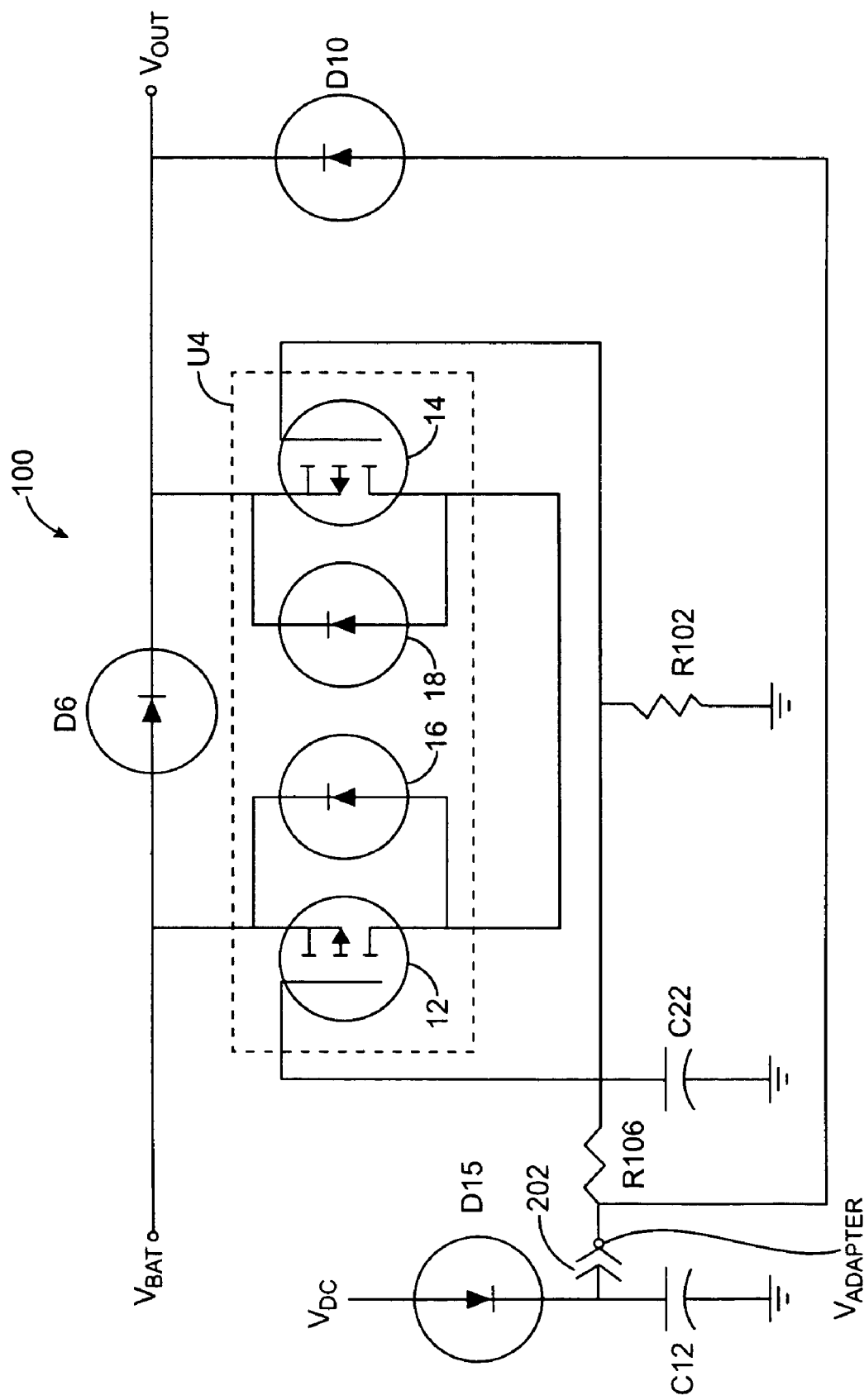
FIG. 2 is a circuit diagram of a switching circuit constructed in accordance with the present invention and capable of providing power between two sources.

Referring now to the drawings wherein the showings are for purposes of illustrating a preferred embodiment of the present invention only, and not for purposes of limiting the same, FIG. 2 is a circuit diagram of a circuit 100 capable of switching power between an internal power source and an external power source. The circuit 100 can switch between two input voltages $V_{BAT}$ and $V_{ADAPTER}$ to supply an output voltage $V_{OUT}$. Typically, $V_{BAT}$ is an internal power source supplied by a battery of the device and $V_{ADAPTER}$ is an external power source. Referring to FIG. 2, the voltage $V_{ADAPTER}$ is supplied by an external DC adapter that includes an output stage diode D15, capacitor C12, and plug 202. Power is supplied from voltage source $V_{DC}$ of the DC adapter to the plug 202 through diode D15. Typically, $V_{DC}$ can supply a maximum of two amps. The plug 202 provides the DC voltage from the DC adapter at $V_{ADAPTER}$.

The capacitor C12 of the DC adapter causes brownouts when the DC adapter is removed from the device. The voltage on C12 will not discharge instantly, thereby decreasing the voltage on the gate of U4 relatively slowly. As such, during this period of time, the battery will not be able to supply enough current thereby resulting in a voltage drop at $V_{OUT}$.

The power switching circuit 100 has a MOSFET switch U4 connected between voltage source $V_{BAT}$ and $V_{ADAPTER}$. As previously mentioned, the MOSFET switch U4 has switching transistors 12 and 14, as well as diodes 16 and 18. A FET switch is used to minimize the voltage drop from the main current path. The switch U4 has a voltage drop of about 50 mV, as opposed to a Shottky diode that has a drop of about 300 mV. The switching circuit 100 further includes resistor R102 and diode D10.

In order to provide brownout protection during switching from the internal power source to the external power source, the circuit 100 has an RC network of resistor R106 and capacitor C22. The RC network slows down the voltage rise on the gates of U4 when the DC adapter is connected to the device. Accordingly, the voltage at $V_{ADAPTER}$ can ramp up before the voltage is present at $V_{OUT}$, thereby preventing brownouts during switching.

The values of R106 and C22 are chosen depending on the switching constant of the switch U4. Typically, R106 and C22 are chosen to give a RC time constant which is five times greater than the switching constant of the switch U4. This allows the voltage from the DC adaptor ($V_{ADAPTER}$) to fully ramp up by slowing down the voltage rise on the gate of U4.

The switching circuit 100 further includes diode D6 to prevent brownouts when the DC adaptor is removed from the device. The diode D6 will supply enough current from $V_{BAT}$ for proper operation while the switch is not fully on. The voltage drop from $V_{BAT}$ to $V_{OUT}$ is reduced by the voltage drop across diode D6. By using a Shottky diode, it is possible to minimize the voltage drop.

Additional modifications and improvements of the present invention may also be apparent to those of ordinary skill in the art. Thus, the particular combination of parts described and illustrated herein is intended to represent only a certain embodiment of the present invention, and is not intended to serve as a limitation of alternative devices within the spirit and scope of the invention.

The invention claimed is:

1. A circuit for switching power from a first power source and a second power source to an output, the circuit comprising:
   a switching unit for controlling the flow of power from the first power source and the second power source to the output, the switching unit requiring a switching time to effect switching from the first power source to the second power source; and
   an RC network electrically connected to the switching unit, the RC circuit being operative to delay the switching of power from the first power source to the second power source for at least the duration of said switching time in order to provide a continuous supply of power.

2. The circuit of claim 1 wherein the switching unit is a transistor and the RC network delays the switching of the transistor.

3. The circuit of claim 2 wherein the RC network is electrically connected to a gate of the transistor.

4. The circuit of claim 1 wherein the first power source is an internal power source and the second power source is an external power source.

5. The circuit of claim 4 wherein the internal power source is a battery and the second power source is a DC adapter.

6. The circuit of claim 1 wherein a time constant for the RC network is greater than a switching constant for the switching unit.

7. The circuit of claim 6 wherein the time constant for the RC network is about five times greater than the switching constant for the switching unit.

8. A method of switching power from a first power source and a second power source to an output with a circuit having a switching unit and a RC network electrically connected to the switching unit, the method comprising the steps:
   (a) providing power to the output from the first power source with the switching unit;
   (b) controlling the switching time of the switching unit with the RC network; and
   (c) switching power to the output from the first power source to the second power source with the switching unit such that the RC network delays switching to provide a continuous flow of power from the first power source to the second power source.

9. The method of claim 8 wherein the first power source is an internal power source and the second power source is an external power source.

10. The method of claim 9 wherein the first power source is a battery and the second power source is a DC adapter.

11. The method of claim 8 wherein the switching unit is a transistor and step (b) comprises controlling the switching time of the transistor.

12. The method of claim 11 wherein in step (b) the RC network controls the voltage at the gate of the transistor in order to control the switching time.

13. The method of claim 8 wherein a time constant for the RC network is greater than a switching constant for the switching unit.

14. The method of claim 13 wherein the time constant for the RC network is about five times greater than the switching constant for the switching unit.

15. A circuit for switching power between a first power source and a second power source to an output, the circuit comprising:
   switching means for controlling the flow of power between the first power source and the second power source to the output, the switching means requiring a switching time to effect switching from the first power source to the second power source; and switching delay means electrically connected to the switching means, the switching delay means being operative to delay the switching of power between the first power source and the second power source with the switching means for at least the duration of said switching time such that power is continuous.

16. The circuit of claim 15 wherein the switching means is a MOSFET transistor and the switching delay means is a RC network electrically connected to the MOSFET transistor.

17. A circuit for providing a continuous flow of power from a first and second power source to an output, the circuit comprising:

a MOSFET switch electrically connected to the first and second power sources and operative to switch the output to one of the first and second power sources during a switching time; and a RC network electrically connected to a gate of the MOSFET switch, the RC network being operative to delay switching between the first and second power sources for at least the duration of said switching time such that power can increase in the second power source before being connected to the output by the MOSFET switch.

18. The circuit of claim 17 wherein the first power source is an internal battery and the second power source is an external DC adapter.

19. The circuit of claim 17 wherein a time constant for the RC network is greater than a switching constant for the MOSFET switch.

20. The circuit of claim 19 wherein the time constant for the RC network is five times greater than the switching constant for the MOSFET switch.

* * * * *